United States Patent
Crouzen et al.

(10) Patent No.: US 6,593,737 B2
(45) Date of Patent: Jul. 15, 2003

(54) METHOD FOR MEASURING THE WALL THICKNESS OF AN ELECTRICALLY CONDUCTIVE OBJECT

(75) Inventors: Paulus Carolus Nicolaas Crouzen, Amsterdam (NL); Mark Theodoor Looljer, Amsterdam (NL); Johan van der Steen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/931,993

(22) Filed: Aug. 18, 2001

(65) Prior Publication Data

US 2002/0149359 A1 Oct. 17, 2002

(30) Foreign Application Priority Data

Aug. 24, 2000 (EP) .............................. 00307298

(51) Int. Cl.⁷ .............................. G01B 7/06; G01R 35/00
(52) U.S. Cl. ................. 324/225; 324/227; 324/229; 702/38; 702/104
(58) Field of Search ................. 324/225, 229, 324/238, 240, 239, 227; 702/38, 104

(56) References Cited

U.S. PATENT DOCUMENTS

| | | | |
|---|---|---|---|
| 3,555,887 A | 1/1971 | Wood | 12/1 |
| 3,693,075 A * | 9/1972 | Forster | 324/220 |
| 4,383,218 A * | 5/1983 | Hansen et al. | 324/225 |
| 4,492,115 A * | 1/1985 | Kahil et al. | 324/226 |
| 4,644,271 A * | 2/1987 | Toth et al. | 324/228 |
| 4,689,996 A | 9/1987 | Hüschelrath | 12/1 |
| 4,727,322 A | 2/1988 | Lonchampt et al. | 324/229 |
| 4,752,739 A | 6/1988 | Wang | 12/1 |
| 4,843,317 A | 6/1989 | Dew | 324/221 |
| 4,849,693 A * | 7/1989 | Prince et al. | 324/225 |
| 4,945,305 A | 7/1990 | Blood | 324/207.17 |
| 5,059,902 A | 10/1991 | Linder | 12/1 |
| 5,198,764 A | 3/1993 | Spencer | 324/207.26 |
| 5,491,409 A * | 2/1996 | Flora et al. | 324/242 |
| 5,541,510 A * | 7/1996 | Danielson | 324/207.16 |
| 5,569,835 A | 10/1996 | Kenney et al. | 12/1 |
| 5,592,092 A | 1/1997 | Mechler | 324/326 |
| 5,889,401 A | 3/1999 | Jourdain et al. | 324/230 |
| 6,037,768 A * | 3/2000 | Moulder et al. | 324/202 |
| 6,275,030 B1 * | 8/2001 | de Haan | 324/229 |
| 6,344,741 B1 * | 2/2002 | Giguere et al. | 324/225 |

FOREIGN PATENT DOCUMENTS

| | | | |
|---|---|---|---|
| EP | 0321112 A1 | 6/1989 | 12/1 |
| EP | 0964261 | 12/1999 | |
| WO | 98/02714 | 1/1998 | |

OTHER PUBLICATIONS

European Search Report completed Jan. 23, 2001.
PCT International Search Report dated Dec. 11, 2001.

* cited by examiner

*Primary Examiner*—N. Le
*Assistant Examiner*—Darrell Kinder

(57) ABSTRACT

Measuring the wall thickness of an electrically conductive object using a probe comprising a transmitter coil, a first receiver and a second receiver, which method comprises arranging the probe near the object; inducing transient eddy currents in the object and recording the signals of the receivers with time; measuring the wall thickness from a characteristic of one of the signals; calculating a characteristic value from a combination of the signals; and correcting the measured wall thickness for the distance between the probe and the object using a pre-determined relationship between the wall thickness and the characteristic value for different values of the distance between the probe and the object.

20 Claims, 2 Drawing Sheets

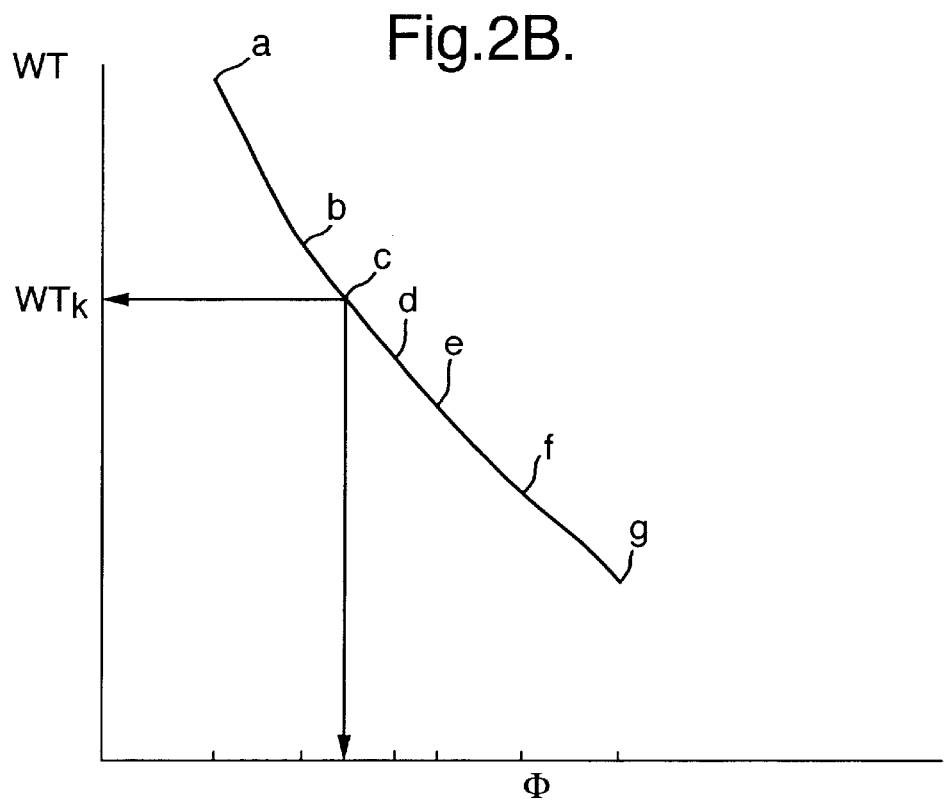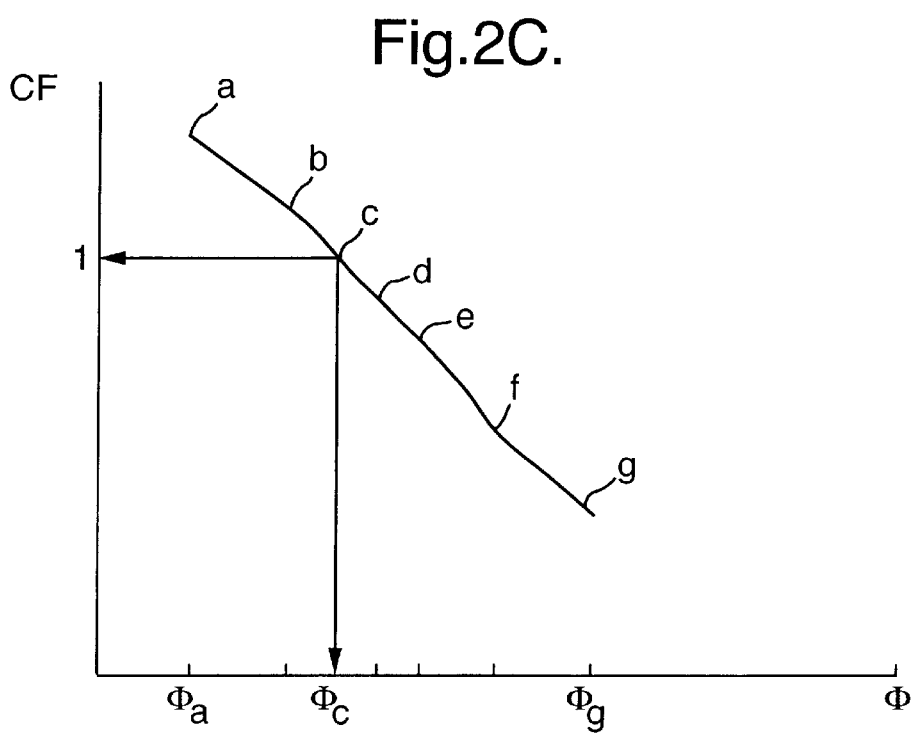

METHOD FOR MEASURING THE WALL THICKNESS OF AN ELECTRICALLY CONDUCTIVE OBJECT

BACKGROUND OF THE INVENTION

1. Field of the Invention

The present invention relates to electromagnetic inspection of an object of electrically conducting material.

2. Description of Related Art

It is known to measure the wall thickness of a conductive object by using eddy currents, bee for example International patent application publication No. WO 98/02 714 and European patent specification No. 321 112. When measuring an unknown wall thickness, there are three wall thicknesses, (1) the actual wall thickness or true wall thickness, (2) the measured wall thickness (before correction) and (3) the corrected wall thickness. Correcting the measured wall thickness must be done in order to get a wall thickness that is nearer to the actual wall thickness than the measured wall thickness before correction.

SUMMARY OF THE INVENTION

In the present electromagnetic inspection method, a probe is used that comprises a transmitter coil for inducing eddy currents in the object, and a receiver system for providing a signal indicative of the strength of the electromagnetic field generated by the eddy currents or of changes in the strength of this electromagnetic field. In particular, the present invention relates to measuring a wall thickness and correcting the measured wall thickness for unknown variations in lift-off. Lift-off is the distance between the probe and the near surface of the object, which is the surface nearest to the probe in contrast to the far surface that is at the opposite side of the object.

Examples of objects that can suitably be inspected with the method according to the present invention are metal plates or walls of container means, such as pipes, vessels or containers, which have a radius of curvature that is larger than the thickness. The electrically conducting material can be any electrically conducting material, for example carbon steel or stainless steel. A further application of the method of the present invention is that the thickness of a layer of insulation can be measured.

It is an object of the present invention to make measurements of the thickness of an object more accurate. To this end the present invention provides a method of measuring the wall thickness of an electrically conductive object using a probe, which probe comprises a transmitter coil for inducing eddy currents in the object, and a receiver system for providing a signal indicative of the strength of the electromagnetic field generated by the eddy currents or of changes in the strength of this electromagnetic field, wherein the receiver system comprises a first receiver and a second receiver that is spaced apart from the first receiver, which method comprises the steps of:

(a) arranging the probe near the object at a distance from the near surface of the object;

(b) inducing transient eddy currents in the object by activating the transmitter and recording the signal of the receivers with time, wherein $V_f(t)$ is the signal of the first receiver with time (t) and $V_u(t)$ is the signal of the second receiver with time (t);

(c) measuring the wall thickness from a characteristic of one of the signals;

(d) calculating a characteristic value, $\Phi$, from a combination of $V_f(t)$ and $V_u(t)$; and (e) correcting the measured wall thickness for the distance between the probe and the near surface of the object using a predetermined relationship between the wall thickness and the characteristic value for different values of the distance between the probe and the near surface

BRIEF DESCRIPTION OF THE DRAWINGS

The invention will now be described by way of example in more detail with reference to the accompanying drawings, wherein.

DESCRIPTION OF THE PREFERRED EMBODIMENTS

Figure 1:
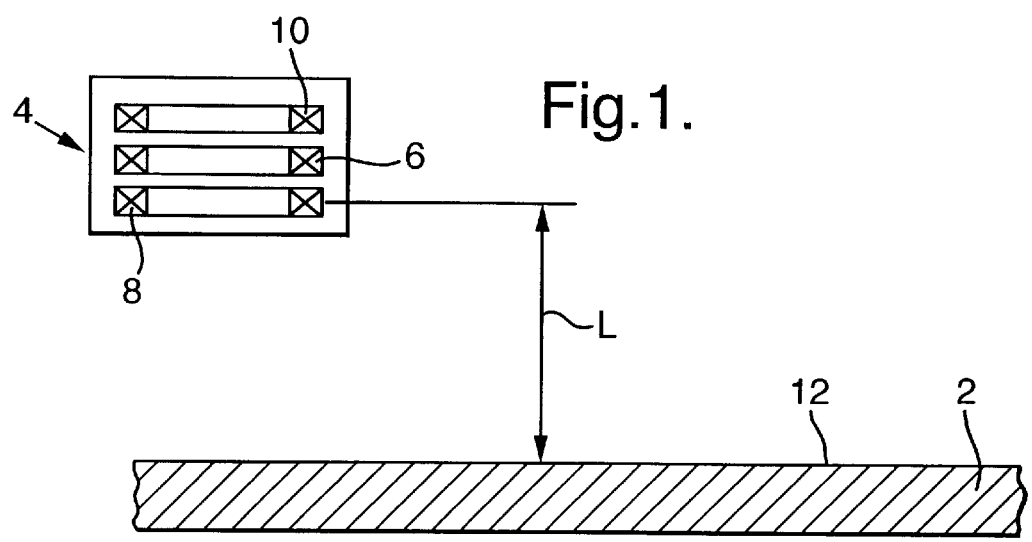
FIG. 1 shows a first embodiment of the invention.

Reference is now made to FIG. 1. The object of electrically conducting material is referred to with reference numeral 2 and the probe is referred to with reference numeral 4. The probe 4 comprises a transmitter coil 6 for inducing eddy currents in the object 2, and a receiver system for providing a signal indicative of the strength of the electromagnetic field generated by the eddy currents or of changes in the strength of this electromagnetic field, wherein the receiver system comprises a first receiver 8 and a second receiver 10 that is spaced apart from the first receiver 8. The transmitter coil 6 is connected to a device (not shown) for energizing the transmitter coil and the receiver system is connected to a device (not shown) for recording the signals from the receiver system. The distance between the probe 4 and the near surface 12 is denoted by L, and the space between the probe 4 and the object 2 is, for example, filled with an insulation layer (not shown) covering the near surface 12. The distance between the receivers 8 and 10 is of the order of the distance L, suitably between 0.1 and 0.9 times the distance L.

During normal operation the probe 4 is arranged above the object 2 near the near surface 12 of the object 2.

Transient eddy currents are induced in the object 2 by activating the transmitter coil 6 (energizing and abruptly de-energizing). The signals of the receivers 8 and 10 are recorded with time. The signal of the first receiver 8 with time (t) is denoted with $V_f(t)$, and the signal of the second receiver 10 with time (t) in denoted with $V_u(t)$. The signals $V_f(t)$ and $V_u(t)$ are indicative of the strength of the magnetic field or changes in the strength of the magnetic field. In the embodiment of FIG. 1, the receivers are coils 8 and 10 and the recorded signals are indicative of changes in the strength of the magnetic field, and the diameter of the receiver coils is of the order of the distance L, suitably between 0.1 and 0.9 times the distance L.

However, when the receivers are Hall effect transducers, or when the signals from the coils are integrated, the signals are indicative of the strength of the magnetic field.

One of the signals $V_f(t)$ and $V_u(t)$ is used to determine the thickness of the object, and both the signals $V_f(t)$ and $V_u(t)$ are used to calculate a characteristic value, $\Phi$. For the sake of completeness we would add that for the present invention it does not matter whether $V_f(t)$ is the signal from the receiver 8 and $V_u(t)$ is the signal from the receiver 10, or the reverse, $V_f(t)$ is the signal from the receiver 10 and $V_u(t)$ is the signal from the receiver 8.

Suitably, determining the characteristic value comprises the steps of recording the signals of the receivers with time, wherein $V_l(t)$ is the signal of the first receiver with time (t) and $V_u(t)$ is the signal of the second receiver with time (t), and determining the characteristic value, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

Applicant has found that to make a correction, it is only required to determine simultaneously the characteristic value, $\Phi_m$, and the wall thickness, $WT_m$.

AS such, it is known to measure the wall thickness of a conductive object by using eddy currents. When measuring an unknown wall thickness, there are three wall thicknesses, (1) the actual wall thickness or true wall thickness, (2) the measured wall thickness (before correction) and (3) the corrected wall thickness. Correcting the measured wall thickness is done in order to get a wall thickness that is nearer to the actual wall thickness than the measured wall thickness before correction.

In practice the measured wall thickness varies with lift-off. The wall thickness measurement can be made more accurate if information on the distance L can be used to correct the measured wall thickness. Applicant has found a correction method, wherein it is not necessary to know the distance or lift-off.

In order to measure wall thickness, the probe 4 is arranged near the object 2 at a distance L from the near surface 12 of the object 2 of which the thickness needs to be determined.

During normal operation, eddy currents are induced in the object 2 by activating the transmitter, and the signals $V_l(t)$ of the first receiver 8 and $V_u(t)$ of the second receiver 10 are recorded with time (t).

From a characteristic of at least one of the signals $V_l(t)$ and $V_u(t)$, the wall thickness, $WT_m$, is determined in the known way. This can be done by determining the amplitude of the signal at a particular moment in time and comparing it with amplitudes determined at that moment for test objects having a known thickness. Alternatively the so-called critical time is used, that is the time after interrupting activating the transmitter at which the eddy currents generated in the object reach the far surface. Another method includes calculating the integral of the signals in time between two predetermined times and obtaining information on the thickness from the calculated value. Another method is determining the time that it takes for the signal to decrease from a first value to a second value and obtaining the thickness from a relation between wall thickness and time.

The combination of the signals $V_l(t)$ and $V_u(t)$ is used to calculate a characteristic value, $\Phi_m$.

Then the measured wall thickness, $WT_m$, is corrected for the unknown distance L between the probe 4 and the near surface 12 of the object 2 using a pre-determined relationship between the wall thickness and the characteristic value for different values of the distance between the probe and the near surface. This relation is determined at one point for the same object or for an object having similar electromagnetic properties. Please note that the unknown distance L can vary with the position along the object.

Reference is made to FIG. 2 showing a way in which a measured wall thickness can be corrected for lift-off.

Starting with an object having a known wall thickness, $WT_k$, one measures the signals $V_l(t)$ and $V_u(t)$. And from the signals the wall thickness, $WT_m$, and the characteristic value, $\Phi$, are determined. This is repeated for a number of different lift-offs at the same location. The wall thickness and the characteristic value are plotted in FIG. 2A, where the horizontal axis is the lift-off, L, and the vertical axis is the wall thickness, WT, and the characteristic value, $\Phi$. The solid line is the measured wall thickness as a function of lift-off and the dashed line is the characteristic value as a function of lift-off. The points a, b, c, d, e, f and g are measured values. The calibration is such that the wall thickness measured at point c, $WT_m(c)$, equals the known wall thickness, $WT_k$.

Figure 2A:
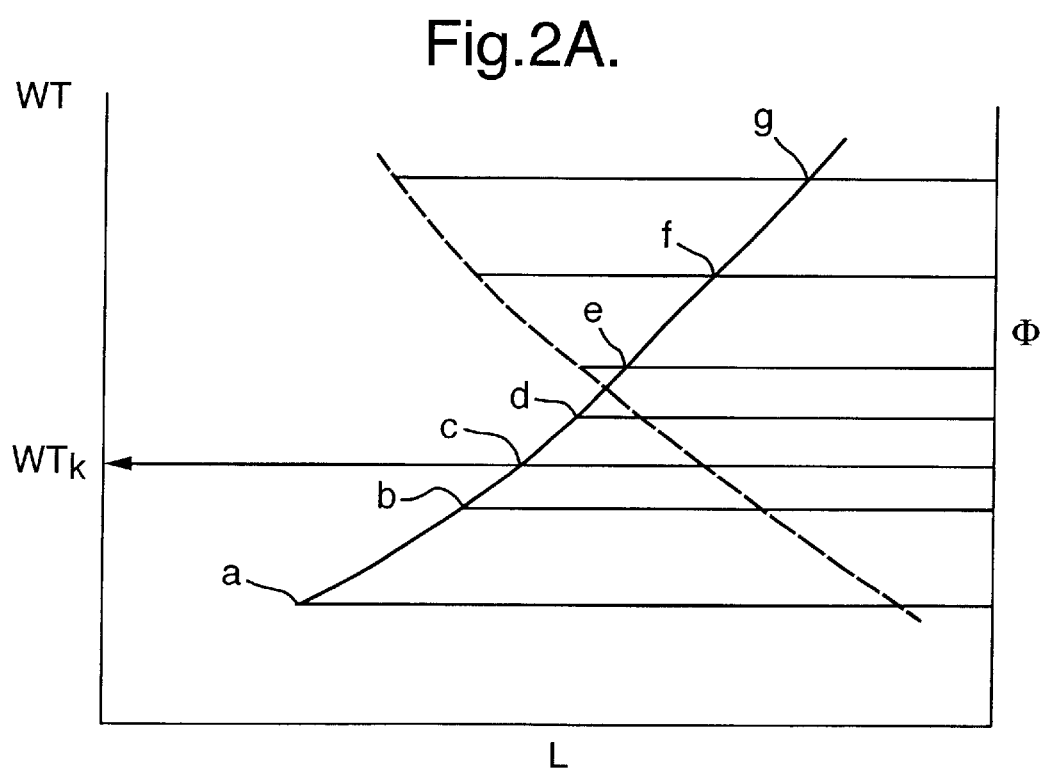
FIG. 2 shows diagrams illustrating correcting measured wall thickness for lift-off.

Then FIG. 2B is obtained from FIG. 2A. FIG. 2B shows the measured wall thickness as a function of characteristic value.

From FIG. 2B the correction factor, CF, is determined and plotted in FIG. 2C. The correction factor CF is the known wall thickness divided by the measured wall thickness, and the correction factor is 1 for $\Phi_c$, larger than 1 for $\Phi<\Phi_c$ and smaller than 1 for 101 $>\Phi_c$. In order to get the correction factor as a continuous function of the characteristic value a curve is drawn through the points.

In order to correct the measured wall thickness of the same object (or an object having similar electromagnetic properties) for an unknown lift-off, the measured wall thickness, $WT_m$ is corrected using the characteristic value, $\Phi_m$. The corrected wall thickness is $Wt_{corr}=WT_m \cdot CF(\Phi_m)$.

Alternatively, the relation between the measured wall thickness and the characteristic value (as shown in FIG. 2B) is approximated as a linear relation. This linear relation has a slope that equals the quotient of the variation of the wall thickness, $\delta WT_1$, and the variation of the characteristic value, $\delta \Phi_1$. The corrected wall thickness is $Wt_{corr}=WT_m+(\Phi_2-\Phi_0)(\delta WT_1/\delta \Phi_1)$, wherein $\Phi_2$ is the characteristic value pertaining to the unknown wall thickness and $\Phi_0$ is the characteristic value for which the correction factor equals 1 ($\Phi_c$ in FIG. 2C).

Suitably, the corrected wall thickness is corrected for the measured temperature of the object. This can be done by determining at a calibration temperature $T_0$ the quotient of the variation of the measured wall thickness $\delta WT$ and the variation of the temperature $\delta T$; and calculating the corrected wall thickness using the following equation $WT_{corr2}=WT_{corr}+(T-T_0)(\delta WT/\delta T)$.

In the embodiment of the probe 4 as shown in FIG. 1, the receivers 9 and 10 are located one above the other in a vertical direction—perpendicular to the near surface 12 of the object 2. In an alternative embodiment (not shown) the receiver antenna means are spaced apart in a horizontal direction—parallel to the near surface 12. This is particularly useful, when a U-shaped ferrite core is used of which the open end points towards the object. The U-shaped ferrite core contains on both legs a transmitter coil and a receiver coil, then a second receiver coil is arranged next to the U-shaped ferrite core.

Corrosion under insulation takes place at pipes covered with insulation material, The insulation material is usually protected against rain by a metal cover. This metal cover is referred to as "jacket". The jacket is often made of aluminum or steel and is about 0.7 mm thick. The jacket is applied in sections with a typical length of 1 m. Ingress of water is prevented by partial overlapping of two jacket sections. The jacket does not need to be removed during inspection with eddy current techniques. To a first approximation, the effect of the jacket is a delay of $\Delta t$ in the received signal: if the signal is s(t) without jacket, it will be about s(t−Δt) in the signal with jacket. The magnitude of Δt varies along the jacket section: near the jacket overlap Δt is larger compared to the value in the middle. Variations in the shift Δt affect conventional pulsed eddy current methods: variation in Δt appears as spurious variations in the measured thickness of the steel. Applicant has found that the method of the present invention, when two receivers are used, is less sensitive to the presence of a metal jacket. A reason is that the characteristic value Φ was experimentally found to be nearly independent of the time t: $\Phi(t) \approx \Phi(t-\Delta t)$, wherein $$\Phi(\tau) = \frac{\sum_{i=1}^{n} V_u(\tau + (i-1)\Delta)}{\sum_{i=1}^{n} V_l(\tau + (i-1)\Delta)}$$

in which latter equation tτ=t or τ=t−Δt.

What is claimed is:

1. A method of measuring the wall thickness of an electrically conductive object using a probe, which probe comprises a transmitter coil for inducing eddy currents in the object, and a receiver system for providing a signal indicative of the strength of the electromagnetic field generated by the eddy currents or of changes in the strength of this electromagnetic field, wherein the receiver system comprises a first receiver and a second receiver that is spaced apart from the first receiver, which method comprises the steps of:
   (a) arranging the probe near the object at a distance from the surface of the object that is nearest to the probe;
   (b) inducing transient eddy currents in the object by activating the transmitter and recording the signal of the receivers with time, wherein $V_l(t)$ is the signal of the first receiver with time (t) and $V_u(t)$ is signal of the second receiver with time (t);
   (c) measuring the wall thickness from a characteristic of one of the signals;
   (d) calculating a characteristic value, Φ, from a combination of $V_l(t)$ and $V_u(t)$; and
   (e) correcting the measured wall thickness for the distance between the probe and the surface of the object that is nearest to the probe using a pre-determined relationship between the wall thickness and the characteristic value for different values of the distance between the probe and the surface of the object that is nearest to the probe.

2. The method according to claim 1, wherein correcting the measured wall thickness comprises the steps of:
   measuring the wall thickness and determining the characteristic value for an object having a known wall thickness for different values of the lift-off;
   deriving a relation between the measured wall thickness and characteristic value, and obtaining a correction factor from this relation; and
   determining the corrected wall thickness by multiplying the measured wall thickness with a correction factor pertaining to the characteristic value.

3. The method according to claim 2, wherein correcting the measured wall thickness, $WT_m$, comprises the steps of:
   determining a characteristic value $\Phi_0$ for which the correction factor equals 1;
   deriving from the relation between the measured wall thickness and the characteristic value the quotient of the variation of the wall thickness, $\delta WT_1$, and the variation of the characteristic value, $\delta F_1$; and
   correcting the measured wall thickness, $WT_m$, for an unknown lift-off $Wt_{corr} = WT_m + (\Phi_2 - \Phi_0)(\delta WT_1/\delta \Phi_1)$, wherein $\Phi_2$ is the characteristic value measured together with the wall thickness $WT_m$.

4. The method according to claim 1, further including the steps of:
   measuring the temperature of the object and correcting the corrected wall thickness for the temperature.

5. The method according to claim 2, further including the steps of:
   measuring the temperature of the object and correcting the corrected wall thickness for the temperature.

6. The method according to claim 3, further including the steps of:
   measuring the temperature of the object and correcting the corrected wall thickness for the temperature.

7. The method according to claim 1, wherein correcting the corrected wall thickness for the temperature comprises the steps of:
   determining at a calibration temperature $T_0$ the quotient of the variation of the measured wall thickness $\delta WT$ and the variation of the temperature $\delta T$; and
   calculating the corrected wall thickness using the following equation $$WT_{corr2} = WT_{corr} + (T-T_0)(\delta WT/\delta T).$$

8. The method according to claim 2, wherein correcting the corrected wall thickness for the temperature comprises the steps of:
   determining at a calibration temperature $T_0$ the quotient of the variation of the measured wall thickness $\delta WT$ and the variation of the temperature $\delta T$; and
   calculating the corrected wall thickness using the following equation $$WT_{corr2} = WT_{corr} + (T-T_0)(\delta WT/\delta T).$$

9. The method according to claim 3, wherein correcting the corrected wall thickness for the temperature comprises the steps of:
   determining at a calibration temperature $T_0$ the quotient of the variation of the measured wall thickness $\delta WT$ and the variation of the temperature $\delta T$; and
   calculating the corrected wall thickness using the following equation $$WT_{corr2} = WT_{corr} + (T-T_0)(\delta WT/\delta T).$$

10. The method according to claim 4, wherein correcting the corrected wall thickness for the temperature comprises the steps of:
    determining at a calibration temperature $T_0$ the quotient of the variation of the measured wall thickness $\delta WT$ and the variation of the temperature $\delta T$; and
    calculating the corrected wall thickness using the following equation $$WT_{corr2} = WT_{corr} + (T-T_0)(\delta WT/\delta T).$$

11. The method according to claim 1, wherein calculating the characteristic value from a combination of $V_l(t)$ and $V_u(t)$ comprises the step of determining the characteristic value from the equation, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

12. The method according to claim 2, wherein calculating the characteristic value from a combination of $V_l(t)$ and $V_u(t)$ comprises the step of determining the characteristic value from the equation, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

13. The method according to claim 3, wherein calculating the characteristic value from a combination of $V_l(t)$ and $V_u(t)$ comprises the step of determining the characteristic value from the equation, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

14. The method according to claim 4, wherein calculating the characteristic value from a combination of $V_l(t)$ and $V_u(t)$ comprises the step of determining the characteristic value from the equation, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

15. The method according to claim 7, wherein calculating the characteristic value from a combination of $V_l(t)$ and $V_u(t)$ comprises the step of determining the characteristic value from the equation, $$\Phi = \frac{\sum_{i=1}^{n} V_u(t_0 + (i-1)\Delta)}{\sum_{i=1}^{n} V_l(t_0 + (i-1)\Delta)}$$

wherein $t_0$ is an initial time, $\Delta$ is the sample interval and n is the number of samples that are included in the summation.

16. The method according to claim 1, wherein the receiver system comprises a first receiver coil and a second receiver coil that is spaced apart from the first receiver coil, and wherein the signal represents the change of the eddy current, and wherein $V_l$ and $V_u$ are the voltages at the terminals of the first and second receiver coil, respectively.

17. The method according to claim 2, wherein the receiver system comprises a first receiver coil and a second receiver coil that is spaced apart from the first receiver coil, and wherein the signal represents the change of the eddy current, and wherein $V_l$ and $V_u$ are the voltages at the terminals of the first and second receiver coil, respectively.

18. The method according to claim 3, wherein the receiver system comprises a first receiver coil and a second receiver coil that is spaced apart from the first receiver coil, and wherein the signal represents the change of the eddy current, and wherein $V_l$ and $V_u$ are the voltages at the terminals of the first and second receiver coil, respectively.

19. The method according to claim 4, wherein the receiver system comprises a first receiver coil and a second receiver coil that is spaced apart from the first receiver coil, and wherein the signal represents the change of the eddy current, and wherein $V_l$ and $V_u$ are the voltages at the terminals of the first and second receiver coil, respectively.

20. The method according to claim 7, wherein the receiver system comprises a first receiver coil and a second receiver coil that is spaced apart from the first receiver coil, and wherein the signal represents the change of the eddy current, and wherein $V_l$ and $V_u$ are the voltages at the terminals of the first and second receiver coil, respectively.

* * * * *